United States Patent
Xu et al.

(10) Patent No.: US 11,378,961 B2
(45) Date of Patent: Jul. 5, 2022

(54) METHOD FOR GENERATING PREDICTION TRAJECTORIES OF OBSTACLES FOR AUTONOMOUS DRIVING VEHICLES

(71) Applicant: Baidu USA LLC, Sunnyvale, CA (US)

(72) Inventors: Kecheng Xu, Sunnyvale, CA (US); Jinghao Miao, Sunnyvale, CA (US); Yajia Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 63 days.

(21) Appl. No.: 15/955,498

(22) Filed: Apr. 17, 2018

(65) Prior Publication Data

US 2019/0317511 A1   Oct. 17, 2019

(51) Int. Cl.
*G05D 1/02* (2020.01)
*G06F 17/11* (2006.01)
*B60W 30/095* (2012.01)
*B60W 30/09* (2012.01)
*G05D 1/00* (2006.01)

(52) U.S. Cl.
CPC .......... *G05D 1/0214* (2013.01); *B60W 30/09* (2013.01); *B60W 30/0956* (2013.01); *G05D 1/0088* (2013.01); *G06F 17/11* (2013.01); *G05D 2201/0213* (2013.01)

(58) Field of Classification Search
None
See application file for complete search history.

(56) References Cited

U.S. PATENT DOCUMENTS 9,227,632 B1 * 1/2016 Lee ................ B60W 10/20
2007/0027597 A1   2/2007 Breuel et al.
(Continued)

FOREIGN PATENT DOCUMENTS

CN   101367382 A1   2/2009
CN   101536058 A1   9/2009
(Continued)

OTHER PUBLICATIONS

Zhang et al; Prediction Method of Vehicle Trajectory Based on Probability Statistics, Journal of Military Transportation University vol. 19, No. 8, Aug. 2017, 6 pages.

*Primary Examiner* — Kevin P Mahne
*Assistant Examiner* — Hongye Liang
(74) *Attorney, Agent, or Firm* — Womble Bond Dickinson (US) LLP

(57) ABSTRACT

According to one embodiment, an obstacle is predicted to move from a starting point to an end point based on perception data perceiving a driving environment surrounding an ADV that is driving within a lane. A longitudinal movement trajectory from the starting point to the end point is generated in view of a shape of the lane. A lateral movement trajectory from the starting point to the end point is generated, including optimizing a shape of the lateral movement trajectory using a first polynomial function. The longitudinal movement trajectory and the lateral movement trajectory are then combined to form a final predicted trajectory that predicts how the obstacle is to move. A path is generated to control the ADV to move in view of the predicted trajectory of the obstacle, for example, to avoid the collision with the obstacle.

12 Claims, 11 Drawing Sheets

(56) References Cited

U.S. PATENT DOCUMENTS

| | | | | |
|---|---|---|---|---|
| 2009/0037064 A1 * | 2/2009 | Nakamura | ........... | B60W 40/114 701/70 |
| 2010/0030472 A1 | 2/2010 | Kindo et al. | | |
| 2017/0186322 A1 * | 6/2017 | Bonarens | .............. | B60W 30/12 |

FOREIGN PATENT DOCUMENTS

| | | | | |
|---|---|---|---|---|
| CN | 105539434 A1 | | 5/2016 | |
| CN | 107010057 A1 | | 8/2017 | |
| CN | 107240299 A1 | | 10/2017 | |
| CN | 107346611 A1 | | 11/2017 | |
| DE | 102017118651 | * | 8/2017 | |
| JP | 2007534041 | | 11/2007 | |
| WO | WO-2019034514 A1 | * | 2/2019 | ........ B60W 30/0953 |

* cited by examiner

METHOD FOR GENERATING PREDICTION TRAJECTORIES OF OBSTACLES FOR AUTONOMOUS DRIVING VEHICLES

TECHNICAL FIELD

Embodiments of the present disclosure relate generally to operating autonomous vehicles. More particularly, embodiments of the disclosure relate to generating prediction trajectories of obstacles for autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. In planning a path to control an autonomous driving vehicle (ADV), the system will predict the movement of each obstacle perceived based on the driving environment surrounding the ADV. Typically, when predicting a movement trajectory representing a lateral movement path of an obstacle, conventional systems utilize a fixed exponential curve. However, such a curve sometimes is not aligned with the heading direction of the obstacle. In addition, the conventional systems also do not take into consideration of the shape of the lane, which may cause safety or comfort issues to the passengers.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
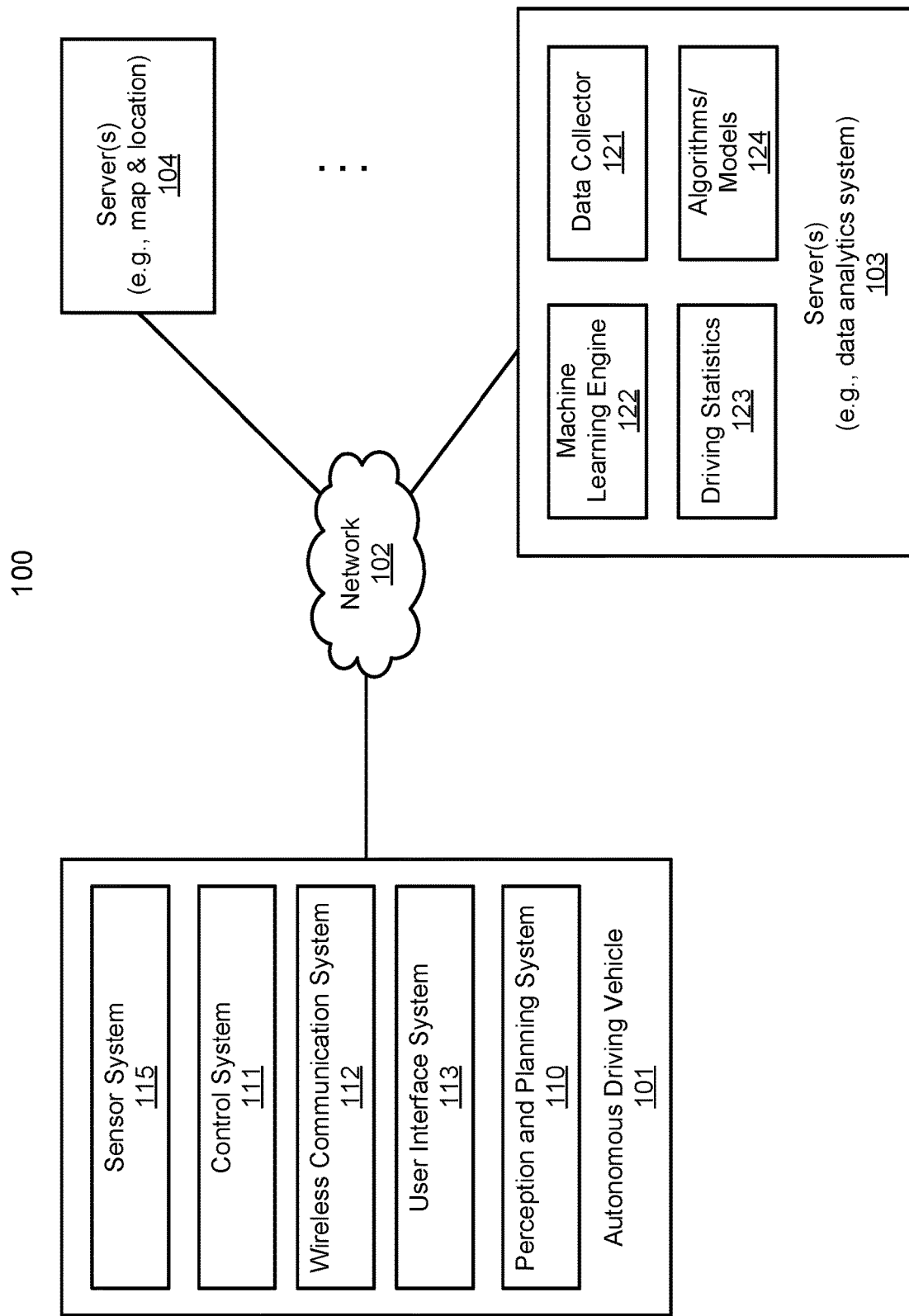
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, when predicting a movement trajectory of an obstacle, a prediction system or module divides the trajectory prediction into two parts: 1) a longitudinal movement trajectory generation and 2) a lateral movement trajectory generation. The lateral movement trajectory (also simply referred to as a lateral trajectory) is generated including optimizing the trajectory using a first polynomial function. The longitudinal movement trajectory (also simply referred to as a longitudinal trajectory) is generated including optimizing the trajectory using a second polynomial function. The optimizations are performed based on current states of the obstacle as initial states and predicted end states of the obstacle as a set of constraints, such that the trajectories are smoothly aligned with at least a current heading direction of the obstacle. The end states are determined in view of the shape of a lane which the obstacle is predicted to move onto. Once the longitudinal movement trajectory and the lateral movement trajectory have been defined and generated, a final predicted trajectory for the obstacle can be determined by combining the longitudinal movement trajectory and the lateral movement trajectory. As a result, the predicted trajectory of the obstacle is more accurate based on the current states of the obstacle and the shape of the lane.

According to one embodiment, an obstacle is predicted to move from a starting point to an end point based on perception data perceiving a driving environment surrounding an ADV that is driving within a lane. A longitudinal movement trajectory from the starting point to the end point is generated in view of a shape of the lane. A lateral movement trajectory from the starting point to the end point is generated, including optimizing a shape of the lateral movement trajectory using a first polynomial function. The longitudinal movement trajectory and the lateral movement trajectory are then combined to form a final predicted trajectory that predicts how the obstacle is to move. A path is generated to control the ADV to move in view of the predicted trajectory of the obstacle, for example, to avoid the collision with the obstacle.

The longitudinal movement trajectory and the lateral movement trajectory are optimized to generate smooth trajectories in view of the current heading direction of the obstacle. The first polynomial function includes a quintic polynomial function. In optimizing the lateral movement trajectory, in one embodiment, a set of initial lateral states (also referred to as lateral initial states) associated with the obstacle is determined based on the current states of the obstacle (e.g., position, speed, heading direction). A set of end lateral states (also referred to as lateral end states) is also determined based on the current states of the obstacle. The initial lateral states and the end lateral states are utilized as a set of constraints to be satisfied by the first polynomial function to optimizing the lateral moving trajectory.

According to another embodiment, in optimizing the longitudinal movement trajectory, a second polynomial function such as a quartic polynomial function is utilized. A set of initial longitudinal states and end longitudinal states (also referred to as longitudinal initial states and longitudinal end states) are determined based on the current states of the obstacle. The initial longitudinal states and end longitudinal states are utilized as a part of a set of constraints for optimizing using the second polynomial function.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
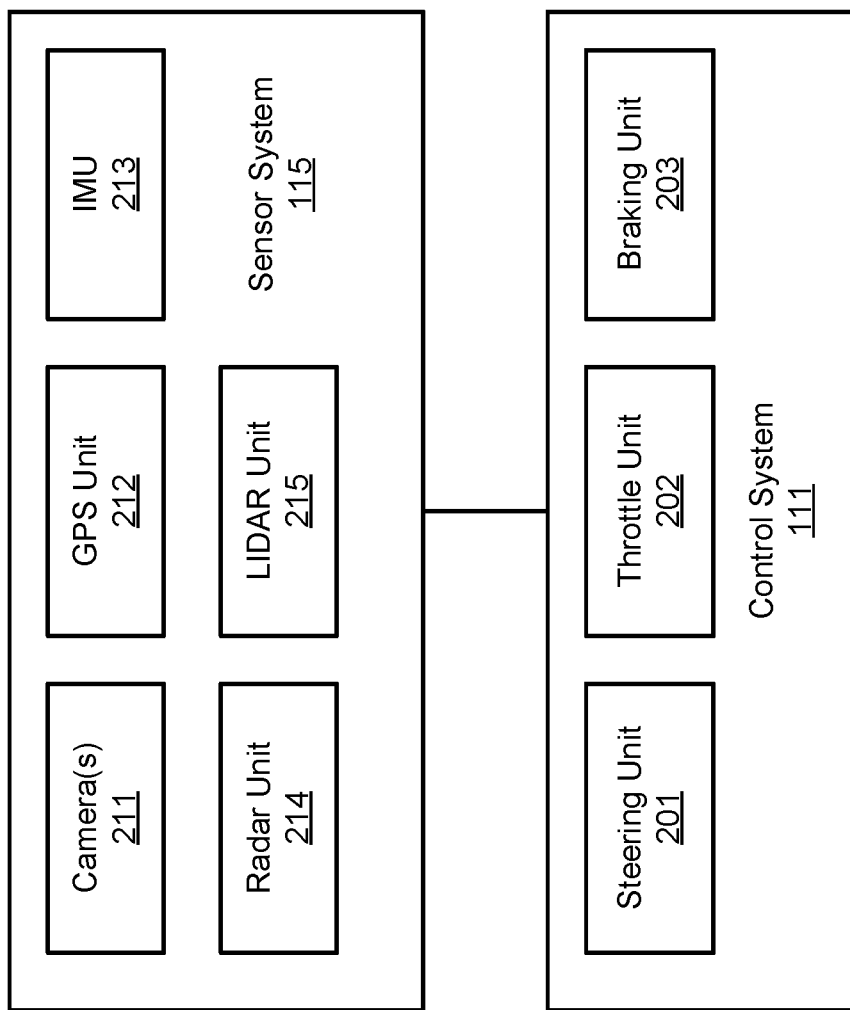
FIG. 2 is a block diagram illustrating an example of an autonomous vehicle according to one embodiment.

Referring now to FIG. 2, in one embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 include algorithms to predict a moving trajectory of an obstacle perceived by a perception module such as perception module 302 in view of the driving environment surrounding an ADV. Specifically, algorithms 124 may include an algorithm to generate a longitudinal movement trajectory, an algorithm to generate a lateral movement trajectory, and an algorithm to combine the longitudinal and lateral movement trajectories to generate a final predicted trajectory predicting how an obstacle will move in a next predetermined period of time (e.g., a next planning or driving cycle). Such algorithms 124 can then be uploaded onto an ADV for predicting the moving trajectories of obstacles during autonomous driving in real-time.

Figure 3A:
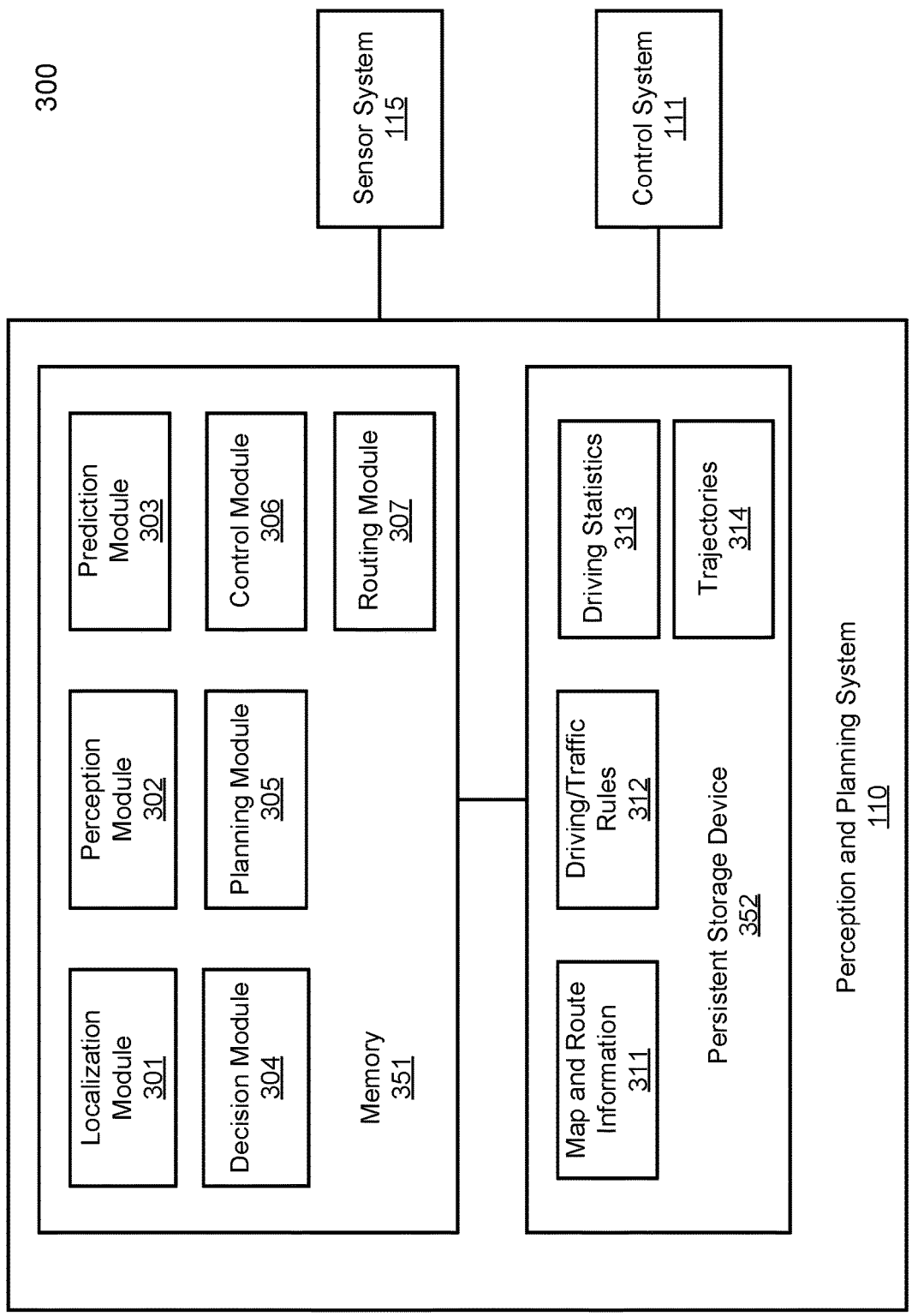
FIGS. 3A-3B are block diagrams illustrating an example of a perception and planning system used with an autonomous vehicle according to one embodiment.
Figure 3B:
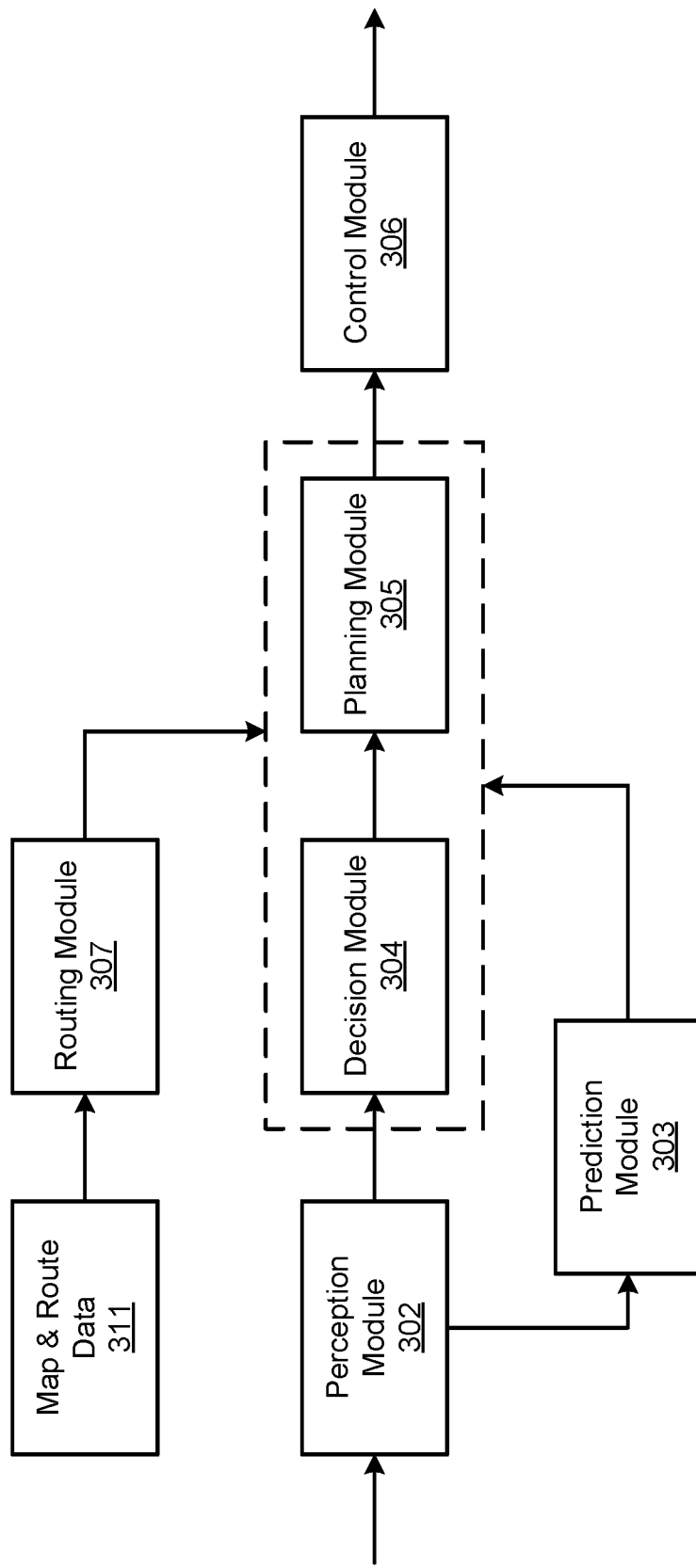

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, when predicting a movement trajectory of an obstacle, prediction module 303 divides the trajectory prediction into two parts: 1) a longitudinal movement trajectory generation and 2) a lateral movement trajectory generation. The lateral movement trajectory is generated by prediction module 303, including optimizing the trajectory using a first polynomial function. The longitudinal movement trajectory is generated prediction module 303, including optimizing the trajectory using a second polynomial function. The optimizations are performed based on current states of the obstacle as start states and predicted end states of the obstacle as a set of constraints, such that the trajectories are smoothly aligned with a current heading direction of the obstacle. A state of an obstacle or ADV includes information describing a location (e.g., x, y, z), a speed, a heading direction, and/or an acceleration of the obstacle or ADV. The end states are determined in view of the shape of a lane which the obstacle is predicted to move onto. The states of the ADV and/or obstacles may be maintained and stored as a part of driving statistics 313. Similarly, the trajectories generated during the autonomous driving may be stored as a part of trajectories 314. Trajectories 314 may also be stored as a part of driving statistics 313.

Once the longitudinal movement trajectory and the lateral movement trajectory have been defined and generated, prediction module 303 generates a final predicted trajectory for the obstacle by combining the longitudinal movement trajectory and the lateral movement trajectory. As a result, the predicted trajectory of the obstacle is more accurate based on the current states of the obstacle and the shape of the lane.

Figure 4:
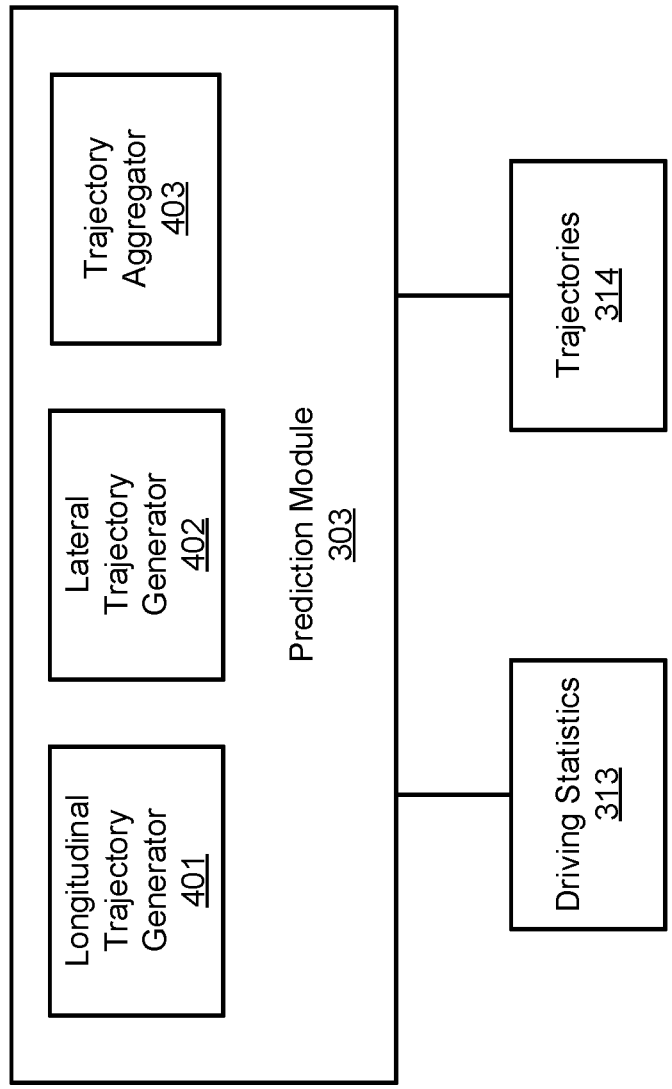
FIG. 4 is a block diagram illustrating an example of a predicting module according to one embodiment.

FIG. 4 is a block diagram illustrating an example of a prediction module according to one embodiment. Referring to FIG. 4, prediction module 303 includes, but is not limited to, a longitudinal trajectory generator 401 (also simply referred to as a longitudinal trajectory module), a lateral trajectory generator 402 (also simply referred to as a lateral trajectory module), and a trajectory aggregator 403, where modules 401-403 can be implemented in software, hardware, or a combination thereof.

According to one embodiment, based on perception data provided by perception module 302, prediction module 303 predicts an obstacle moving from a starting point to an end point based on perception data perceiving a driving environment surrounding an ADV that is driving within a lane. Longitudinal trajectory generator 401 generates a longitudinal movement trajectory from the starting point to the end point in view of a shape of the lane. Lateral trajectory generator 402 generates a lateral movement trajectory from the starting point to the end point, including optimizing a shape of the lateral movement trajectory using a first polynomial function. Trajectory aggregator 403 then combines the longitudinal movement trajectory and the lateral movement trajectory to form a final predicted trajectory that predicts how the obstacle is to move. A path is then generated, for example, by planning module 305, to control the ADV to move in view of the predicted trajectory of the obstacle, for example, to avoid the collision with the obstacle.

The longitudinal movement trajectory and the lateral movement trajectory are optimized by longitudinal trajectory generator 401 and lateral trajectory generator 402 respectively to generate smooth trajectories in view of the current heading direction of the obstacle. The first polynomial function includes a quintic polynomial function. In optimizing the lateral movement trajectory, in one embodiment, a set of initial lateral states associated with the obstacle is determined based on the current states of the obstacle (e.g., position, speed, heading direction). A set of end lateral states is also determined based on the current states of the obstacle. The initial lateral states and the end lateral states are utilized as a set of constraints to be satisfied by the first polynomial function to optimizing the lateral moving trajectory.

According to another embodiment, in optimizing the longitudinal movement trajectory, a second polynomial function such as a quartic polynomial function is utilized. A set of initial longitudinal states and end longitudinal states are determined based on the current states of the obstacle. The initial longitudinal states and end longitudinal states are utilized as a part of a set of constraints for optimizing using the second polynomial function.

Figure 5:
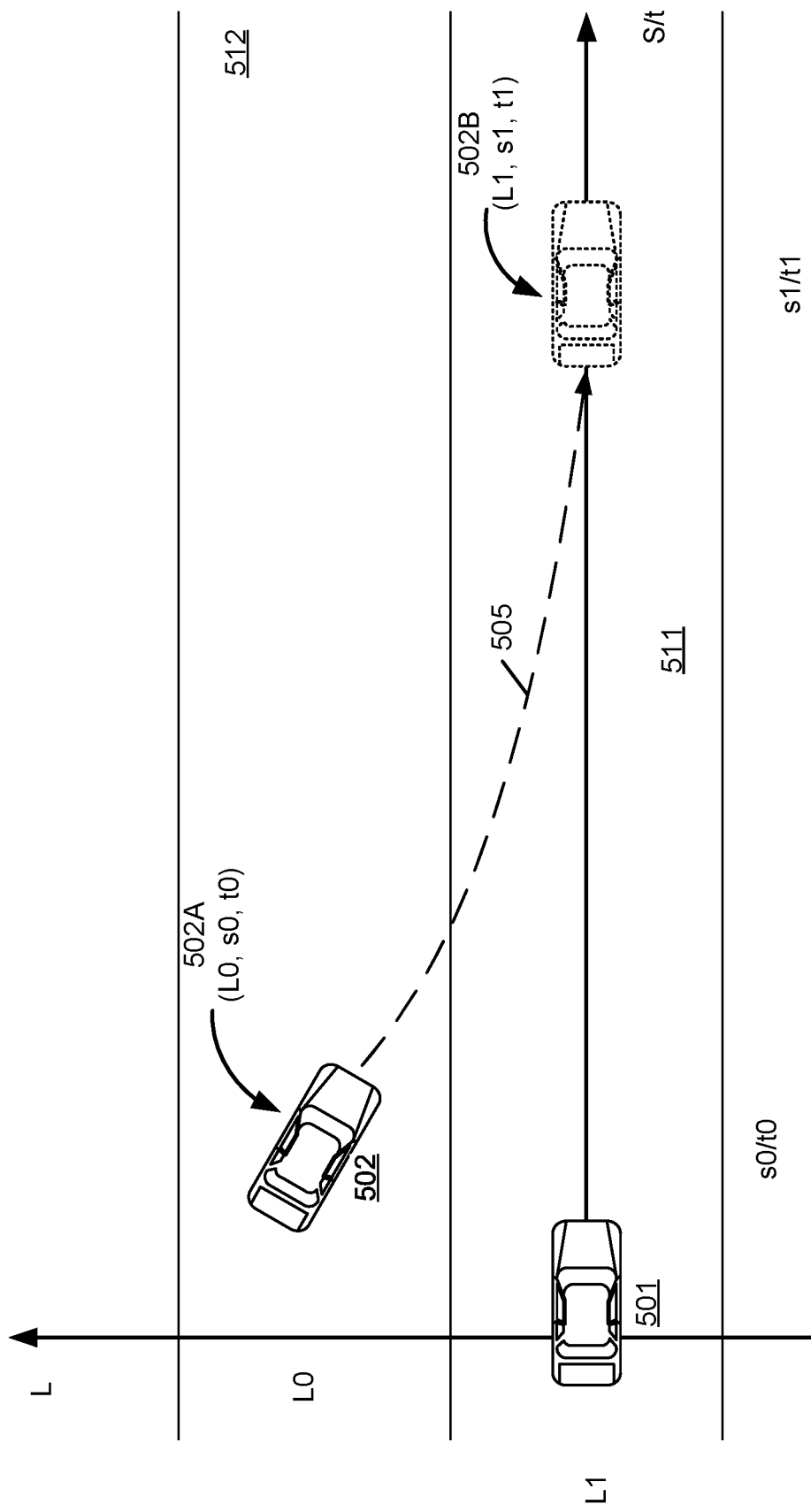
FIG. 5 is a block diagram illustrating driving scenario for predicting a movement trajectory of an obstacle according to one embodiment.

Referring now to FIG. 5, in this example, ADV 501 is driving on lane 511 and vehicle 502 (as an example of an obstacle) is changing lane from lane 512 to lane 511. It is assumed that ADV 501 and vehicle 502 will drive along a center line (e.g., reference line) of lane 511 eventually. When prediction module 303 determines such a driving scenario, prediction module 303 is configured to predict that vehicle 502 will start at time t0, enter lane 511, and reach the center line of lane 511 at time t1. Prediction module 303 then predicts and determines trajectory 505 that vehicle 502 will drive along to enter lane 511 from location 502A to location 502B at time t1. Such trajectory 505 will have an impact on how planning module 305 to plan a path for ADV 501 to move within lane 511 or change to another lane such as lane 512. Conventional autonomous driving systems would utilize a fixed curve such as exponential curves to determine a lateral trajectory of vehicle 502, without considering some of the current states of vehicle 502 such as speed and heading direction, and without considering the shape of lane 511.

According to one embodiment, referring now to FIGS. 4 and 5, when perception module 302 detects and perceives vehicle 502 time t0, prediction module 303 is invoked to predict what and how vehicle 502 will move in the near future, i.e., a next planning cycle. In predicting how vehicle 502 would move in a predetermined period of time, in this example, time t1 at which it is predicted vehicle 502 would arrive at the center line of lane 511, predicting module 302 predicts trajectory 505 that vehicle 502 would move. The shape of trajectory 505 may have an impact on how to plan a path or trajectory for ADV 501.

In determining trajectory 505, the initial states of vehicle 502 at time t0 are determined, which include the location (e.g., x, y, z), speed, heading direction, and acceleration of vehicle 502 at starting point 502A of time t0. The end states of vehicle 502 at end point 502B of time t1 are also estimated. Trajectory 505 between starting point 502A and end point 502B is generated. Trajectory 505 is then optimized using a polynomial function based on the initial states and end states of vehicle 502, such that vehicle 502 can drive along trajectory 505 smoothly, i.e., safely and comfortably.

According to one embodiment, in predicting trajectory 505, the prediction is divided into two parts: (1) lateral trajectory prediction/generation and (2) longitudinal trajectory prediction/generation. Lateral trajectory generator 402 is configured to generate a lateral trajectory and longitudinal trajectory generator 401 is configured to generate a longitudinal trajectory using one or more polynomial optimization functions, also referred to as a polynomial fit of a trajectory. That is, a target predicted trajectory is optimized to be similar to a curve defined by a polynomial function, where a set of constraints are satisfied. The set of constraints are defined based on the initial states and end states of the target trajectory, such that at least the heading direction and curvature of the trajectory are aligned with the location, speed, and heading direction of the initial starting point, i.e., the initial states. As a result, the predicted trajectory is similar to the one that an ordinary driver would have driven under the circumstances.

According to one embodiment, when generating a lateral movement trajectory using a first polynomial function, an initial lateral state is determined. The initial lateral state includes an initial lateral offset ($l_0$), an initial lateral speed ($\dot{l}_0$), and an initial lateral acceleration ($\ddot{l}_0$). The initial lateral speed $\dot{l}_0$ presents a derivative of the initial lateral offset to time ($dl_0/dt$). The initial lateral acceleration $\ddot{l}_0$ represents a derivative of the initial lateral speed ($d\dot{l}_0/dt$)

To determine an end lateral state, lateral trajectory generator 402 first computes the time to reach lane center ($t_l$) from the initial lateral offset and the initial lateral speed. It is assumed that the end lateral offset ($l_1$) is 0 (e.g., at s/t axis as shown in FIG. 5), because it is assumed the vehicle will move along the lane central line after it reaches the lane center. It is also assumed that the end lateral speed ($\dot{l}_1$) is 0, which is the first-order derivative of the end lateral offset to time. This is because it is assumed that the vehicle has no attempt to leave the lane center. It is also assumed that the end lateral acceleration ($\ddot{l}_1$) is 0, which is the second-order derivative of the end lateral offset to time. This is because it is assumed the vehicle has no attempt to leave the lane center.

Figure 6:
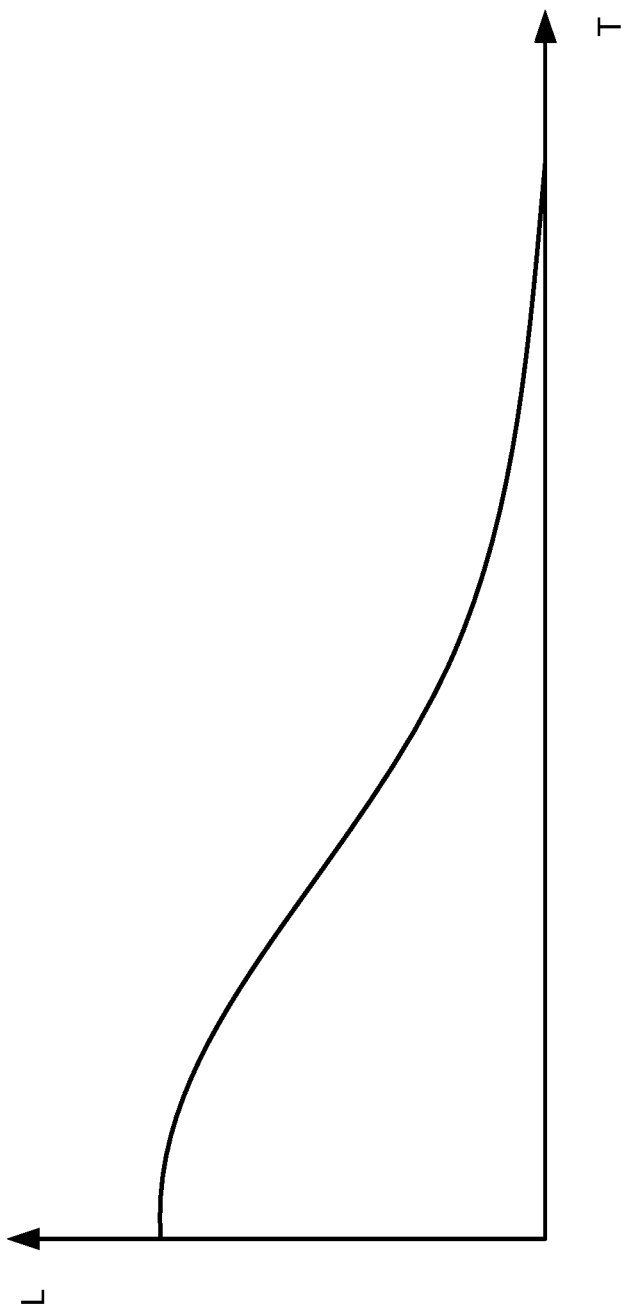
FIG. 6 shows an example of a lateral movement trajectory according to one embodiment.

Given the initial lateral states ($l_0, \dot{l}_0, \ddot{l}_0$) at time t0 and the end lateral states ($l_1, \dot{l}_1, \ddot{l}_1$) at time $t_{lat}$ (in this example, t1 as shown in FIG. 5), in one embodiment, lateral trajectory generator 402 can fit a quintic polynomial l(t) for lateral part of the trajectory, generating a lateral movement trajectory, for example, as shown in FIG. 6. This quintic polynomial satisfies the following conditions:

$$l(0)=l_0, \dot{l}(0)=\dot{l}_0, \ddot{l}(0)=\ddot{l}_0$$

$$l(t_{lat})=l_1, \dot{l}(t_{lat})=0, \ddot{l}(t_{lat})=0$$

In algebra, a quintic function is a function of the following form:

$$l(x)=ax^5+bx^4+cx^3+dx^2+cx+f$$

The coefficients a, b, c, d, e and f are members of a field, typically the rational numbers, the real numbers or the complex numbers, and a is nonzero. In other words, a quintic function is defined by a polynomial of degree five. Since the initial lateral states and end lateral states constitute five equations as constraints, the above quintic polynomial function can be optimized (e.g., smooth and continuous) while satisfying a set of constraints set forth above based on the initial lateral state and end lateral state.

According to one embodiment, in generating a longitudinal movement trajectory using a second polynomial function, longitudinal trajectory generator 401 needs to determine the initial longitudinal state and the end longitudinal state. The initial longitudinal state can be derived from the vehicle's current state (e.g., location, speed, heading direction, acceleration, etc.). Referring back to FIG. 5, the initial longitudinal state includes an initial longitudinal offset $s_0$, an initial longitudinal speed $\dot{s}_0$, and an initial longitudinal acceleration $\ddot{s}_0$.

Figure 7:
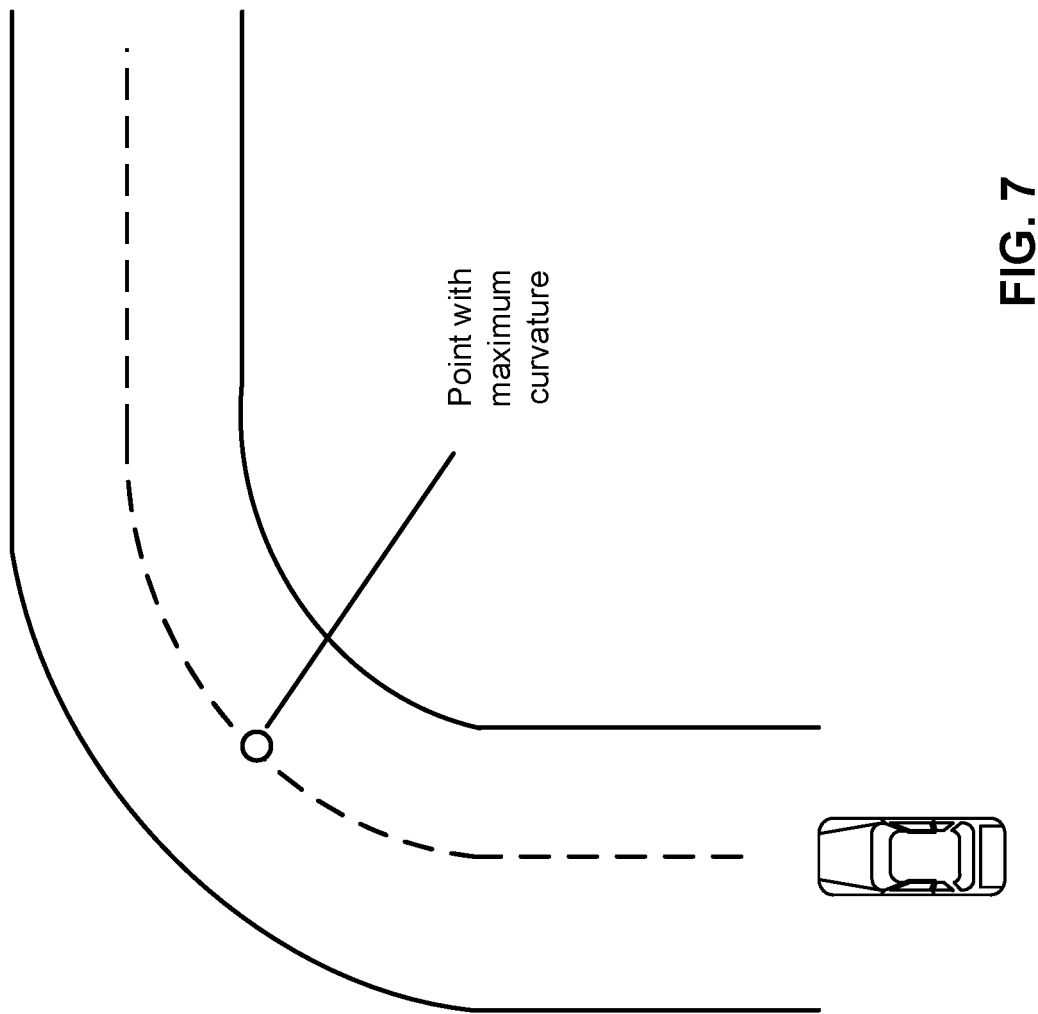
FIG. 7 shows an example of a curve lane which may be utilized to determine an end point of a longitudinal trajectory.

Before computing the end longitudinal state, longitudinal trajectory generator 401 first computes the time to reach the end longitudinal state. In determining the time to reach the end longitudinal state, longitudinal trajectory generator 401 takes into consideration of the shape of lane which is represented by the curvatures. A lane can be a substantially straight or a curve lane. Referring now to FIG. 7, longitudinal trajectory generator 401 searches the lane for a certain distance (e.g., 150 meters) ahead of the ADV 501. In one embodiment, the position of the largest curvature (k) is determined and denoted as $s_1$.

In one embodiment, based on the curvature k, a velocity at the point s1 with the maximum curvature can be obtained using the following formula:

$$v(\kappa)=8.5-45.8\times(\kappa-0.02) \text{ when } \kappa \in (0.02, 0.14)$$

where $v(\kappa)=3$ when $\kappa \geq 0.14$.

Figure 8B:
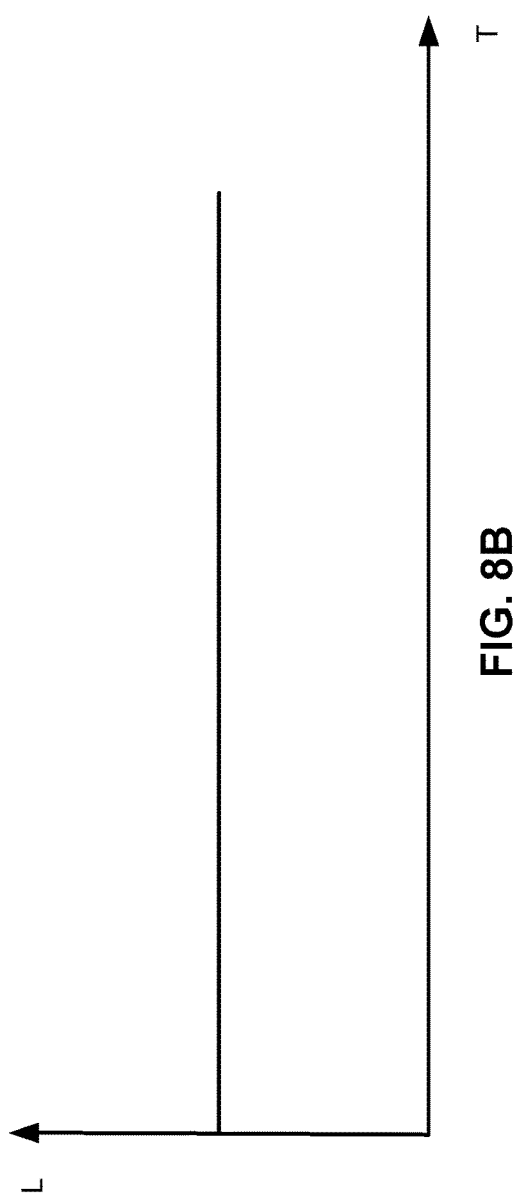
FIGS. 8A and 8B show examples of longitudinal movement paths for different lanes according to certain embodiments.
Figure 8A:
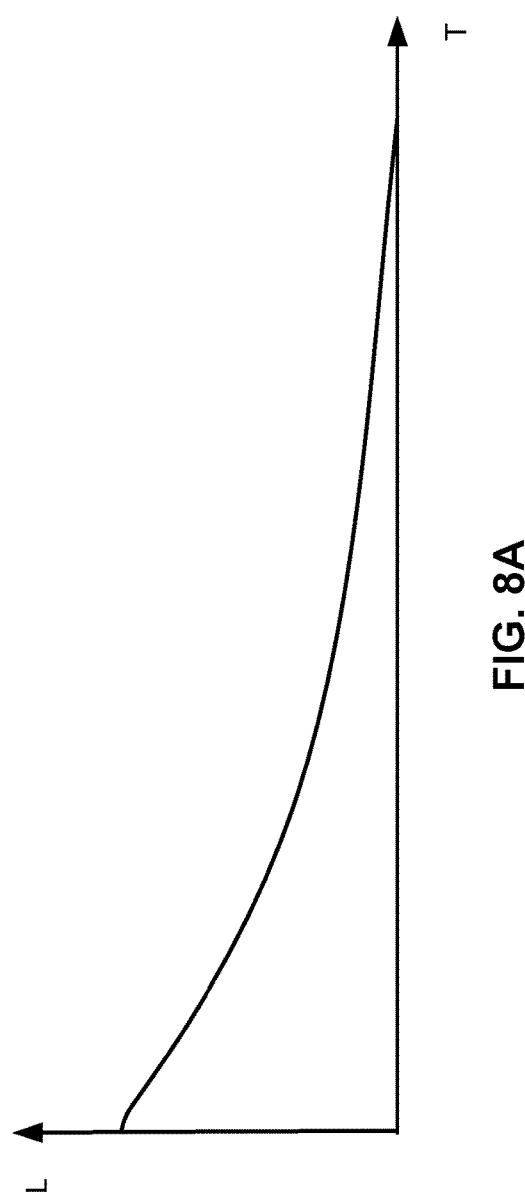

If the largest curvature k is greater than 0.02 radius per meter (radius/meter), the formula described above can be utilized to compute the speed on that position which is the end longitudinal speed ($\dot{s}_1$). FIG. 8A shows an example of a longitudinal movement trajectory on a curve lane, where the distance (S) between the ADV and the obstacle gradually reduce. The time to reach that end longitudinal speed can be computed by constant-decreasing-speed movement $$t_{long}=2(s_1-s_0)/(\dot{s}_0+\dot{s}_1)$$

If the largest curvature is less than 0.02 radius/meter, that means the lane is straight. In this case, the end longitudinal speed can be designated the same as the current speed, and the time to reach the end longitudinal speed $t_{long}$ can be set to a default value 5.0, which represents the duration of prediction period. In both cases, it is assumed that the end longitudinal acceleration is 0. FIG. 8B shows an example of a longitudinal movement trajectory on a relatively straight lane, in which the ADV and the obstacle maintain the relatively the same speed or distance between them. In this example, the distance (S) between the ADV and the obstacle remain constant.

In one embodiment, longitudinal trajectory generator 401 can compute the longitudinal part of the trajectory by a quartic polynomial denoted as s(t). It satisfies the following conditions $$s(0)=s_0, \dot{s}(0)=\dot{s}_0, \ddot{s}(0)=\ddot{s}_0$$

$$\dot{s}(t_{long})=\dot{s}_1, \ddot{s}(t_{long})=0$$

A quartic polynomial function can be defined as follows:

$$f(x)=ax^4+bx^3+cx^2+dx+e$$

To form the final trajectory, we are given a sequence of time points $\{t_0, t_1, t_2, \ldots, t_n\}$, and the computed lateral polynomial l(t) and the longitudinal polynomial s(t) are defined and provided. For each time point $t_i$, trajectory aggregator 403 can compute $$s_i=s(t_i), l_i=l(t_i)$$

For each pair of ($s_i, l_i$), trajectory aggregator 403 can form the point ($x_i, y_i$) in the Cartesian coordinate. And finally, trajectory aggregator 403 can generator a sequence of points $\{(x_0, y_0), (x_1, y_1), \ldots, (x_n, y_n)\}$ to form the final predicted trajectory. Based on the predicted trajectory of the obstacle, a path can be planned for the ADV to navigate in view of the movement of the obstacle, for example, to avoid collision with the obstacle.

The term of polynomial optimization or polynomial fit refers to the optimization of the shape of a curve (in this example, a trajectory) represented by a polynomial function, such that the curve is continuous (e.g., a derivative can be obtainable) over along the curve. In the field of autonomous driving, the polynomial curve from a starting point to an end point is divided into a number of segments (or pieces), each segment corresponding to a control point (or reference point). Such a segmented polynomial curve is referred to as a piecewise polynomial. When optimizing the piecewise polynomial, a set of joint constraints and a set of boundary constraints between two adjacent segments have to be satisfied, in addition to the set of initial state constraints and end state constraints.

The set of joint constraints includes positions (x, y), speed, heading direction, and acceleration of the adjacent segments have to be identical. For example, the ending position of a first segment (e.g., leading segment) and the starting position of a second segment (e.g., following segment) have to be identical or within a predetermined proximity. The speed, heading direction, and acceleration of the ending position of the first segment and the corresponding speed, heading direction, and acceleration of the starting position of the second segment have to be identical or within a predetermined range. In addition, each control point is associated with a predefined boundary (e.g., 0.2 meters left and right surrounding the control point). The polynomial curve has to go through each control point within its corresponding boundary. When these two set of constraints are satisfied during the optimization, the polynomial curve representing a trajectory should be smooth and continuous.

Figure 9:
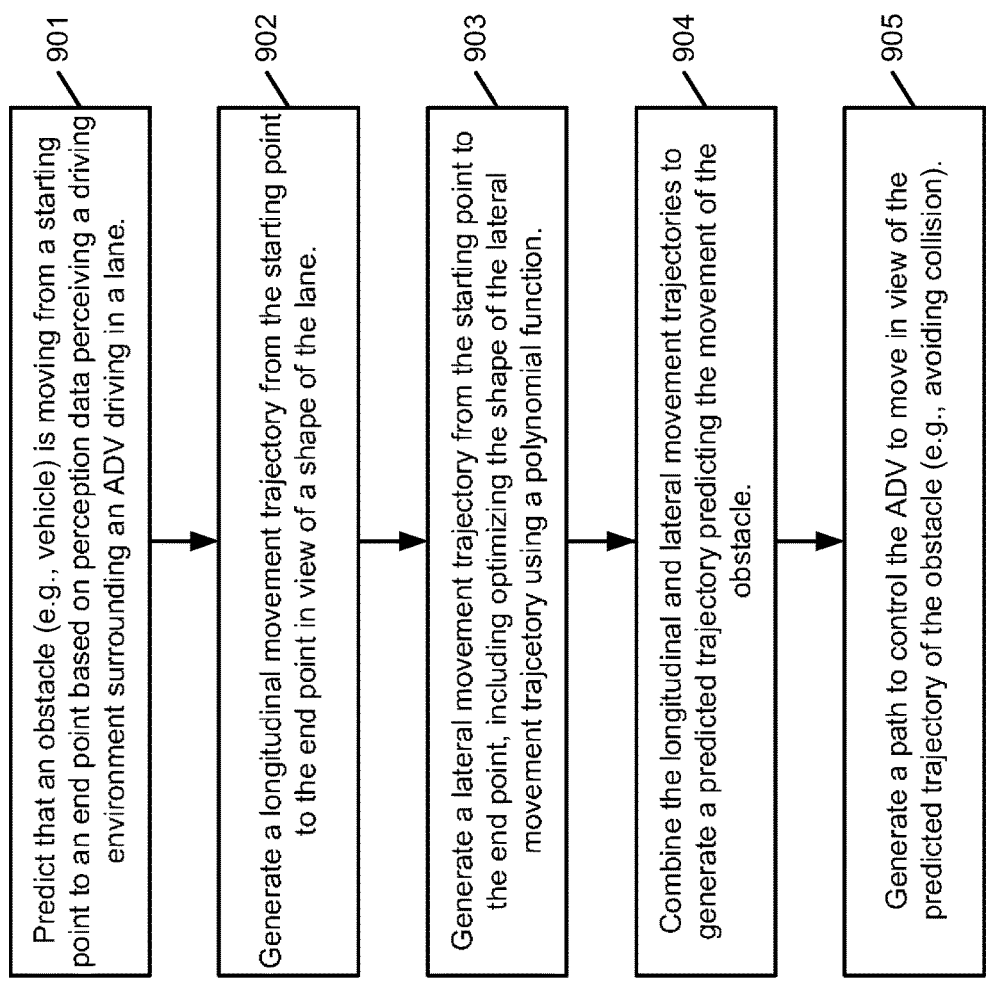
FIG. 9 is a flow diagram illustrating an example of a process for predicting the movement of an obstacle according to one embodiment.

FIG. 9 is a flow diagram illustrating a process of predicting a trajectory of an obstacle according to one embodiment. Process 900 may be performed by processing logic which may include software, hardware, or a combination thereof. For example, process 900 may be performed by prediction module 303. Referring to FIG. 9, in operation 901, processing logic predicts that an obstacle is moving from a starting point to an end point based on perception data perceiving a driving environment surrounding an ADV driving within a lane. In operation 902, processing logic generates a longitudinal movement trajectory from the starting point to the end point in view of the shape of the lane. In operation 903, processing logic generates a lateral movement trajectory from the starting point to the end point, including optimizing a shape of the lateral movement trajectory using a first polynomial function. In operation 904, the longitudinal movement trajectory and the lateral movement trajectory are combined to form a final predicted trajectory. In operation 905, the ADV is controlled to move in view of the predicted trajectory of the obstacle. In one embodiment, the longitudinal movement trajectory is optimized using a second polynomial function. The first polynomial function may be a quintic polynomial function and the second polynomial function may be quartic polynomial function.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
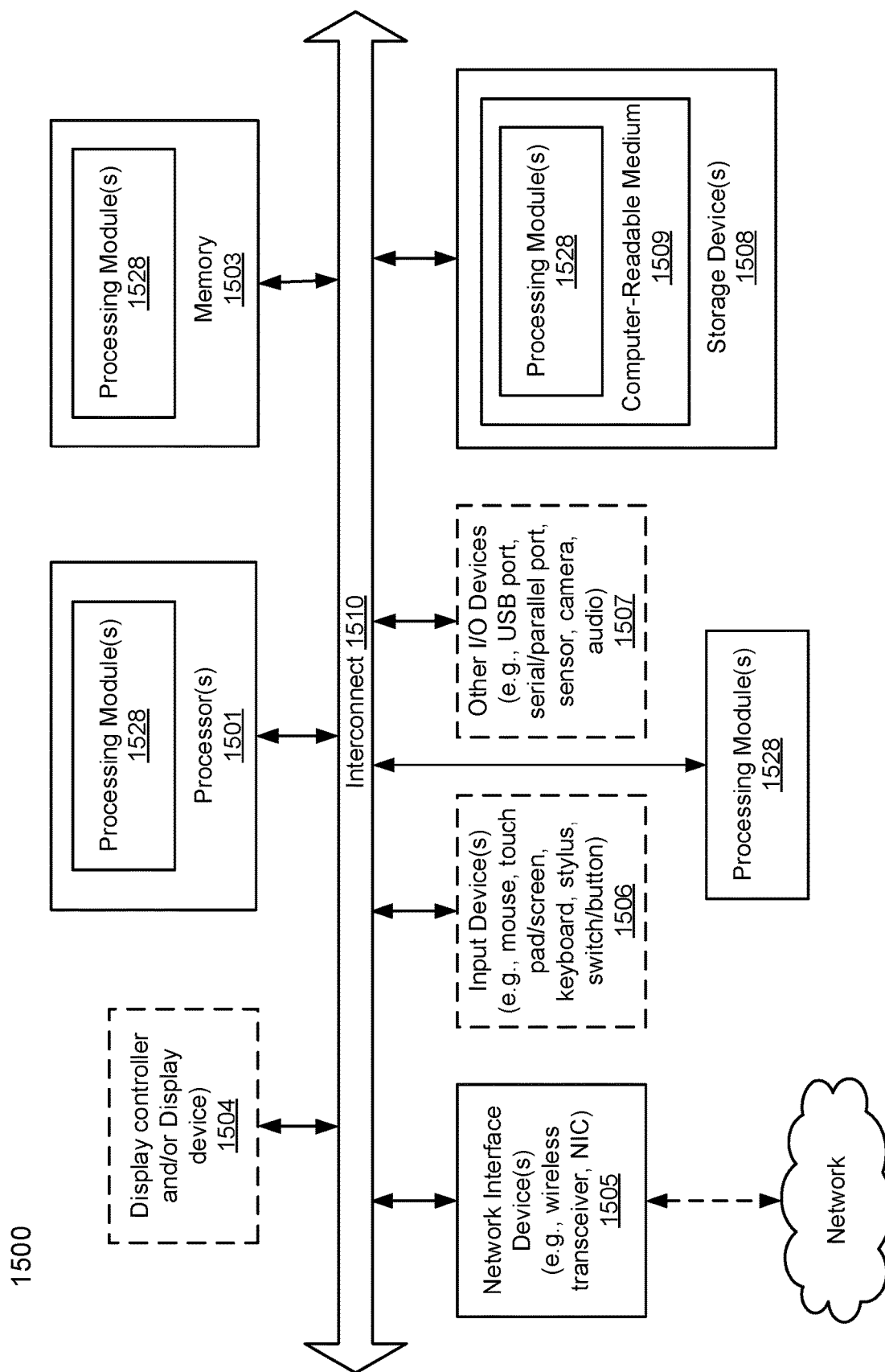
FIG. 10 is a block diagram illustrating a data processing system according to one embodiment.

FIG. 10 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include 10 devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, predicting module 303, planning module 305, and/or control module 306. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for predicting a trajectory of an obstacle during autonomous driving, the method comprising:
    predicting that the obstacle is moving from a starting point to an end point based on perception data generated through perceiving a driving environment of an autonomous driving vehicle (ADV) driving within a lane;
    generating a longitudinal movement trajectory of the obstacle from the starting point to the end point in view of a shape of the lane, including determining an initial longitudinal state and an end longitudinal state, the end longitudinal state including an end longitudinal speed, wherein
        a) when a maximum curvature of the lane is greater than a threshold, a speed at a point of the maximum curvature is calculated and used as the end longitudinal speed, and when the maximum curvature of the lane is less than the threshold, a current speed of the obstacle is used as the end longitudinal speed, wherein a time to reach the end longitudinal speed is set to a default value representing a duration of a prediction period, and
        b) the initial longitudinal state and the end longitudinal state are used as constraints to a second polynomial function used to optimize a shape of the longitudinal movement trajectory;
    generating a lateral movement trajectory of the obstacle from the starting point to the end point, including optimizing a shape of the lateral movement trajectory using a first polynomial function, wherein the first polynomial function is a quintic polynomial function that satisfies at least one of the following set of initial lateral constraints a) an initial value of the first polynomial function is equal to an initial lateral offset of the obstacle, b) an initial value of a first derivative of the first polynomial function is equal to an initial lateral speed of the obstacle, and c) an initial value of the second derivative of the first polynomial function is equal to an initial lateral acceleration of the obstacle, the generating the lateral movement trajectory of the obstacle from the starting point to the end point further comprising:
        determining an initial lateral state including an initial lateral offset and an initial lateral speed of the ADV, and
        determining an end lateral state by calculating a time to reach a central line of a target lane from the initial lateral state based on the initial lateral offset and the initial lateral speed, wherein the end lateral state includes that an end lateral offset is zero indicating that the ADV reaches the central line of the target lane since an offset distance between the ADV and the central line of the target lane is zero, wherein the ADV moves along the central line of the target lane after the ADV reaches the central line of the target lane, and wherein the end lateral state includes that an end lateral speed is zero;
    combining the longitudinal movement trajectory and the lateral movement trajectory to generate a predicted trajectory predicting how the obstacle is to move; and
    controlling the ADV to move in view of the predicted trajectory of the obstacle.

2. The method of claim 1, wherein the longitudinal movement trajectory and the lateral movement trajectory are optimized to generate smooth trajectories in view of a current heading direction of the obstacle.

3. The method of claim 1, further comprising:
    determining a set of end lateral states associated with the end point based on a current states of the obstacle, wherein initial lateral states and the set of end lateral states are utilized as a first set of constraints of the first polynomial function to optimize the lateral movement trajectory.

4. The method of claim 1, wherein the second polynomial function is a quartic polynomial function.

5. A non-transitory machine-readable medium having instructions stored therein, which when executed by a processor, cause the processor to perform operations, the operations comprising:
    predicting that an obstacle is moving from a starting point to an end point based on perception data generated through perceiving a driving environment of an autonomous driving vehicle (ADV) driving within a lane;
    generating a longitudinal movement trajectory of the obstacle from the starting point to the end point in view of a shape of the lane, including determining an initial longitudinal state and an end longitudinal state, the end longitudinal state including an end longitudinal speed, wherein
        a) when a maximum curvature of the lane is greater than a threshold, a speed at a point of the maximum curvature is calculated and used as the end longitudinal speed, and when the maximum curvature of the lane is less than the threshold, a current speed of the obstacle is used as the end longitudinal speed, wherein a time to reach the end longitudinal speed is set to a default value representing a duration of a prediction period, and
        b) the initial longitudinal state and the end longitudinal state are used as constraints to a second polynomial function used to optimize a shape of the longitudinal movement trajectory;

generating a lateral movement trajectory of the obstacle from the starting point to the end point, including optimizing a shape of the lateral movement trajectory using a first polynomial function, wherein the first polynomial function is a quintic polynomial function that satisfies at least one of the following set of initial lateral constraints a) an initial value of the first polynomial function is equal to an initial lateral offset of the obstacle, b) an initial value of a first derivative of the first polynomial function is equal to an initial lateral speed of the obstacle, and c) an initial value of the second derivative of the first polynomial function is equal to an initial lateral acceleration of the obstacle, the generating the lateral movement trajectory of the obstacle from the starting point to the end point further comprising:

determining an initial lateral state including an initial lateral offset and an initial lateral speed of the ADV, and determining an end lateral state by calculating a time to reach a central line of a target lane center from the initial lateral offset and the initial lateral speed, wherein the end lateral state includes an end lateral offset is zero indicating that the ADV reaches the central line of the target lane since an offset distance between the ADV and the central line of the target lane is zero, wherein the ADV moves along the central line of the target lane after the ADV reaches the central line of the target lane, and wherein the end lateral state includes that an end lateral speed is zero;

combining the longitudinal movement trajectory and the lateral movement trajectory to generate a predicted trajectory predicting how the obstacle is to move; and controlling the ADV to move in view of the predicted trajectory of the obstacle.

6. The machine-readable medium of claim 5, wherein the longitudinal movement trajectory and the lateral movement trajectory are optimized to generate smooth trajectories in view of a current heading direction of the obstacle.

7. The machine-readable medium of claim 5, wherein the operations further comprise:

determining a set of end lateral states associated with the end point based on a current states of the obstacle, wherein initial lateral states and the set of end lateral states are utilized as a first set of constraints of the first polynomial function to optimize the lateral movement trajectory.

8. The machine-readable medium of claim 5, wherein the second polynomial function is a quartic polynomial function.

9. A data processing system, comprising:

a processor; and a memory coupled to the processor to store instructions, which when executed by the processor, cause the processor to perform operations, the operations including:

predicting that an obstacle, is moving from a starting point to an end point based on perception data generated through perceiving a driving environment of an autonomous driving vehicle (ADV) driving within a lane, generating a longitudinal movement trajectory of the obstacle from the starting point to the end point in view of a shape of the lane, including determining an initial longitudinal state and an end longitudinal state, the end longitudinal state including an end longitudinal speed, wherein a) when a maximum curvature of the lane is greater than a threshold, a speed at a point of the maximum curvature is calculated and used as the end longitudinal speed, and when the maximum curvature of the lane is less than the threshold, a current speed of the obstacle is used as the end longitudinal speed, wherein a time to reach the end longitudinal speed is set to a default value representing a duration of a prediction period, and b) the initial longitudinal state and the end longitudinal state are used as constraints to a second polynomial function used to optimize a shape of the longitudinal movement trajectory, generating a lateral movement trajectory of the obstacle from the starting point to the end point, including optimizing a shape of the lateral movement trajectory using a first polynomial function, wherein the first polynomial function is a quintic polynomial function that satisfies at least one of the following set of initial lateral constraints a) an initial value of the first polynomial function is equal to an initial lateral offset of the obstacle, b) an initial value of a first derivative of the first polynomial function is equal to an initial lateral speed of the obstacle, and c) an initial value of the second derivative of the first polynomial function is equal to an initial lateral acceleration of the obstacle, the generating the lateral movement trajectory of the obstacle from the starting point to the end point further comprising:

determining an initial lateral state including an initial lateral offset and an initial lateral speed of the ADV, and determining an end lateral state by calculating a time to reach a central line of a target lane from the initial lateral state based on the initial lateral offset and the initial lateral speed, wherein the end lateral state includes an end lateral offset is zero indicating that the ADV reaches the central line of the target lane since an offset distance between the ADV and the central line of the target lane is zero, wherein the ADV moves along the central line of the target lane after the ADV reaches the central line of the target lane, and wherein the end lateral state includes that an end lateral speed is zero, combining the longitudinal movement trajectory and the lateral movement trajectory to generate a predicted trajectory predicting how the obstacle is to move, and controlling the ADV to move in view of the predicted trajectory of the obstacle.

10. The data processing system of claim 9, wherein the longitudinal movement trajectory and the lateral movement trajectory are optimized to generate smooth trajectories in view of a current heading direction of the obstacle.

11. The data processing system of claim 9, wherein the operations further comprise:

determining a set of end lateral states associated with the end point based on a current states of the obstacle, wherein initial lateral states and the set of end lateral states are utilized as a first set of constraints of the first polynomial function to optimize the lateral movement trajectory.

12. The data processing system of claim 9, wherein the second polynomial function is a quartic polynomial function.

* * * * *